US012576784B2

(12) United States Patent
Iida

(10) Patent No.: US 12,576,784 B2
(45) Date of Patent: Mar. 17, 2026

(54) IMAGE PROCESSING SYSTEM, MOVABLE APPARATUS, IMAGE PROCESSING METHOD, AND STORAGE MEDIUM THAT INCLUDE A DRIVING CONTROL UNIT TO CONTROL A TRAVELING DIRECTION OF A MOVABLE APPARATUS BASED ON AN OUTPUT OF A PATH CALULATION UNIT

(71) Applicant: CANON KABUSHIKI KAISHA, Tokyo (JP)

(72) Inventor: Yoshinobu Iida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 18/407,537

(22) Filed: Jan. 9, 2024

(65) Prior Publication Data

US 2024/0246487 A1 Jul. 25, 2024

(30) Foreign Application Priority Data

Jan. 19, 2023 (JP) ................................. 2023-006659

(51) Int. Cl.
B60R 1/26 (2022.01)
B60R 11/02 (2006.01)

(52) U.S. Cl.
CPC ............ B60R 1/26 (2022.01); B60R 11/0229 (2013.01); B60R 11/0264 (2013.01); (Continued)

(58) Field of Classification Search
CPC ... B60R 1/26; B60R 11/0229; B60R 11/0264; B60R 2300/301; B60R 2300/302; B60R 2300/8093
See application file for complete search history.

(56) References Cited

U.S. PATENT DOCUMENTS 6,926,374 B2 8/2005 Dudeck et al.
2016/0193998 A1* 7/2016 Yellambalase ........ B60W 30/08
348/148

(Continued)

FOREIGN PATENT DOCUMENTS

DE 19816822 B4 6/2007
JP 2021174014 A 11/2021
WO 2023276819 A1 1/2023

OTHER PUBLICATIONS

Extended European Search Report issued on Mar. 4, 2024, in corresponding EP Patent Application No. 24151337.3 (5 pages).

*Primary Examiner* — Kenneth M Dunne
(74) *Attorney, Agent, or Firm* — Venable LLP

(57) ABSTRACT

A movable apparatus including a rear image acquisition unit configured to acquire a rear image of the movable apparatus, a display unit to display the rear image from the rear image acquisition unit, and at least one processor or circuit configured to function as a path calculation unit configured to calculate an avoidance path for avoiding an obstacle in front, a display control unit configured to cause the display unit to display a rear image of a predetermined angle of field acquired by the rear image acquisition unit when the path calculation unit determines that there is no path in which the obstacle in front is able to be avoided or the movable apparatus enters a path into which the movable apparatus is not allowed to intrude, and a driving control unit to control a traveling direction of the movable apparatus based on an output of the path calculation unit.

9 Claims, 6 Drawing Sheets

(52) U.S. Cl.
CPC ... *B60R 2300/301* (2013.01); *B60R 2300/302* (2013.01); *B60R 2300/8093* (2013.01)

(56) References Cited

U.S. PATENT DOCUMENTS

2020/0023903 A1\*  1/2020  Jeon ......................... B60R 1/26
2021/0146836 A1\*  5/2021  Lee ...................... H04N 23/698

\* cited by examiner

IMAGE PROCESSING SYSTEM, MOVABLE APPARATUS, IMAGE PROCESSING METHOD, AND STORAGE MEDIUM THAT INCLUDE A DRIVING CONTROL UNIT TO CONTROL A TRAVELING DIRECTION OF A MOVABLE APPARATUS BASED ON AN OUTPUT OF A PATH CALULATION UNIT

CROSS-REFERENCE TO PRIORITY APPLICATION

This application claims the benefit of Japanese Patent Application No. 2023-006659, filed on Jan. 19, 2023, which is hereby incorporated by reference herein in its entirety.

BACKGROUND OF THE INVENTION

Field of the Invention

The present invention relates to an image processing system for a movable apparatus, the movable apparatus, an image processing method, and a storage medium.

Description of the Related Art

Some general vehicles have functions of displaying images in front of the vehicles on the sides of right or left turn on monitors in order to avoid bumping, contacts, or the like, during the right or left turns. Here, when a road that a vehicle enters is narrow, the vehicle is likely to come into contact with a vehicle on sides opposite to the sides of right or left turns.

Even when a vehicle approaches an obstacle on the opposite side during a right turn or a left turn and then the driver is notified by sound, or the like, it is necessary to back the vehicle up once and to restart a steering wheel operation in order to avoid contact between the vehicle and the obstacle. However, when there is a following vehicle on the rear side, the vehicle cannot be backed up and there is a problem that there is a possibility of collision with the following vehicle.

As a method of solving the foregoing problem, Japanese Patent Laid-Open No. 2021-174014 discloses an image processing system that performs a collision avoiding process such as warning, braking, or steering based on a traveling direction predicted from a present yaw rate in order to avoid an obstacle in the traveling direction.

When a vehicle turns left and enters a narrow road, there are cases in which a driver performs a steering wheel operation while avoiding contact with a vehicle on the left side, moves the vehicle to some extent, and then avoids contact on the right side of the vehicle. However, when an angle at which the vehicle enters the road is bad, there are cases in which an obstacle cannot be avoided even by restarting a steering wheel operation to move forward.

In such cases, there are cases in which the vehicle is backed up once and a steering wheel operation is restarted, a driver's attention may be diverted to contact in the front, and thus there is a high possibility of a gear being put into reverse instantly to back the vehicle up. In this case, when there is a following vehicle, bicycle, pedestrian, or the like, on the rear side, an accident may occur.

However, in Japanese Patent Laid-Open No. 2021-174014, an obstacle in a traveling direction can be avoided, but a case in which a vehicle cannot move forward due to an obstacle is not taken into account.

SUMMARY OF THE INVENTION

According to an aspect of the present invention, an image processing system includes a rear image acquisition unit configured to acquire a rear image of a movable apparatus, a display unit configured to display the rear image from the rear image acquisition unit, and at least one processor or circuit configured to function as a path calculation unit configured to calculate an avoidance path for avoiding an obstacle in front, and a display control unit configured to cause the display unit to display a rear image of a predetermined angle of field acquired by the rear image acquisition unit when the path calculation unit determines that there is no path in which the obstacle in front is able to be avoided or the movable apparatus enters a path into which the movable apparatus is not allowed to intrude.

Further features of the present invention will become apparent from the following description of embodiments with reference to the attached drawings.

DESCRIPTION OF THE EMBODIMENTS

Hereafter, with reference to the accompanying drawings, favorable modes of the present invention will be described using Embodiments. In each diagram, the same reference signs are applied to the same members or elements, and a duplicate description will be omitted or simplified.

Figure 1:
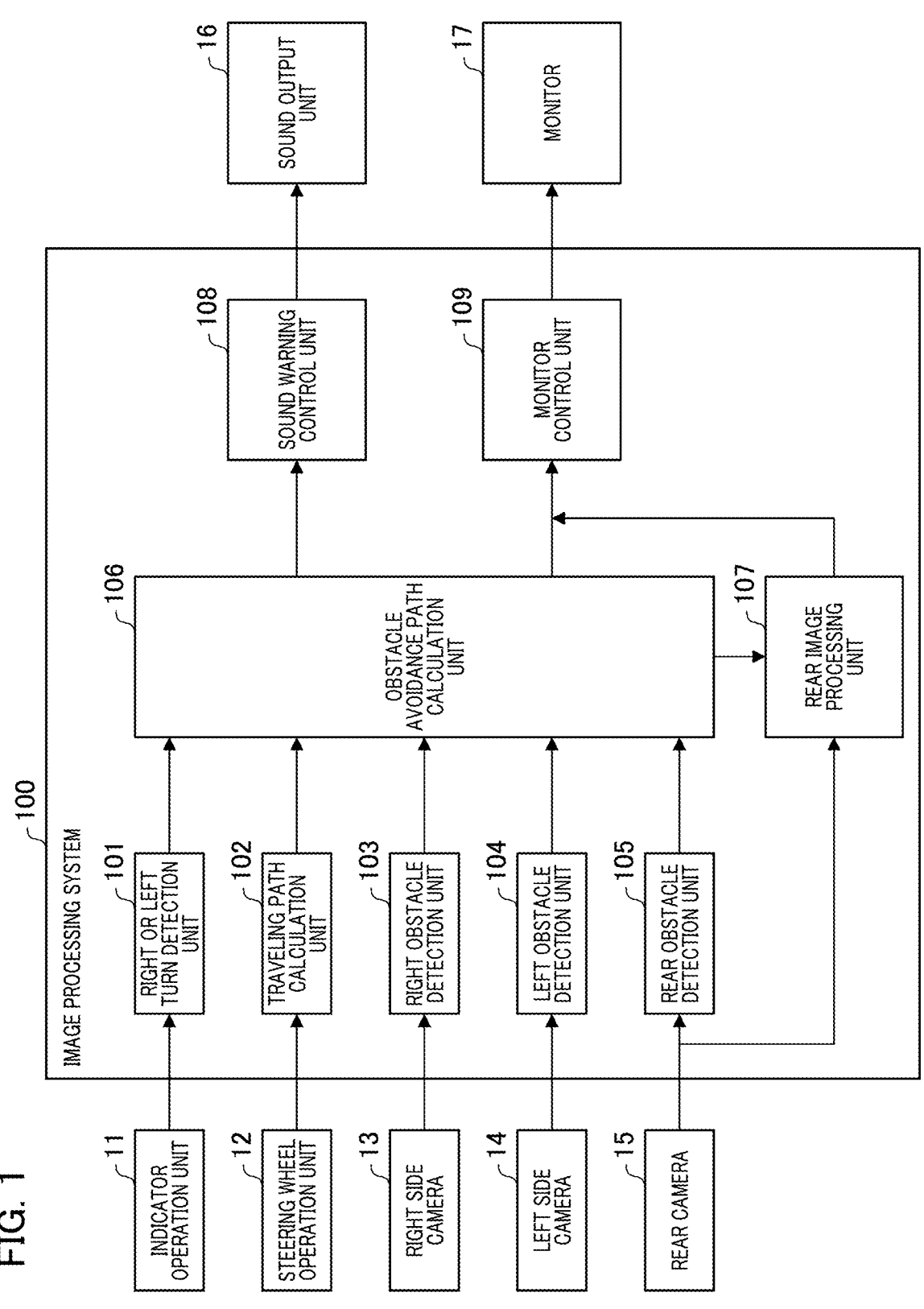
FIG. 1 is a functional block diagram illustrating a configuration example of an image processing system 100 according to an embodiment of the present invention.

FIG. 1 is a functional block diagram illustrating a configuration example of an image processing system 100 according to an embodiment of the present invention. The image processing system 100 according to the present embodiment is used as a driving support system that supports driving a movable apparatus.

Some functional blocks illustrated in FIG. 1 are implemented by causing a CPU, or the like, serving as a computer (not illustrated) included in the image processing system to execute a computer program stored in a memory serving as a storage medium (not illustrated).

However, some or all of the functional blocks may be implemented by hardware. As the hardware, a dedicated circuit (an ASIC), a processor (a reconfigurable processor or a DSP), or the like, can be used. Each functional block illustrated in FIG. 1 may not be contained in the same casing or may be configured with other apparatuses connected to each other via signal lines.

As illustrated in FIG. 1, a signal from an indicator operation unit 11 is given to a right or left turn detection unit 101. The right or left turn detection unit 101 determines whether a turn is a right turn or a left turn. Information regarding a rudder angle of the steering wheel from a steering wheel operation unit 12 is given to a traveling path calculation unit 102. The traveling path calculation unit 102 calculates a traveling path of a vehicle.

Image information from a right side camera 13, a left side camera 14, and a rear camera 15 is given to a right obstacle detection unit 103, a left obstacle detection unit 104, and a rear obstacle detection unit 105, respectively. The right obstacle detection unit 103, the left obstacle detection unit 104, and the rear obstacle detection unit 105 detect whether there are obstacles on the right side, the left side, and the rear side of the vehicle and distances from the vehicle, respectively.

Here, each of the right side camera 13, the left side camera 14, and the rear camera 15 is disposed in a direction in which image information around the vehicle can be imaged and includes an optical system and an image sensor (neither of which is illustrated).

In each of the right side camera 13, the left side camera 14, and the rear camera 15, an optical image of a subject obtained by the optical system is converted into an image signal by the image sensor and image data is generated by performing an analog-to-digital conversion process, an image adjustment process, and the like.

Here, at least the rear camera 15 functions as a rear image acquisition unit that performs a rear image acquisition step of acquiring a rear image of the movable apparatus. In the present embodiment, the right side camera 13 and the left side camera 14 are also used as the rear image acquisition unit that acquires a rear image of the movable apparatus.

Figure 2:
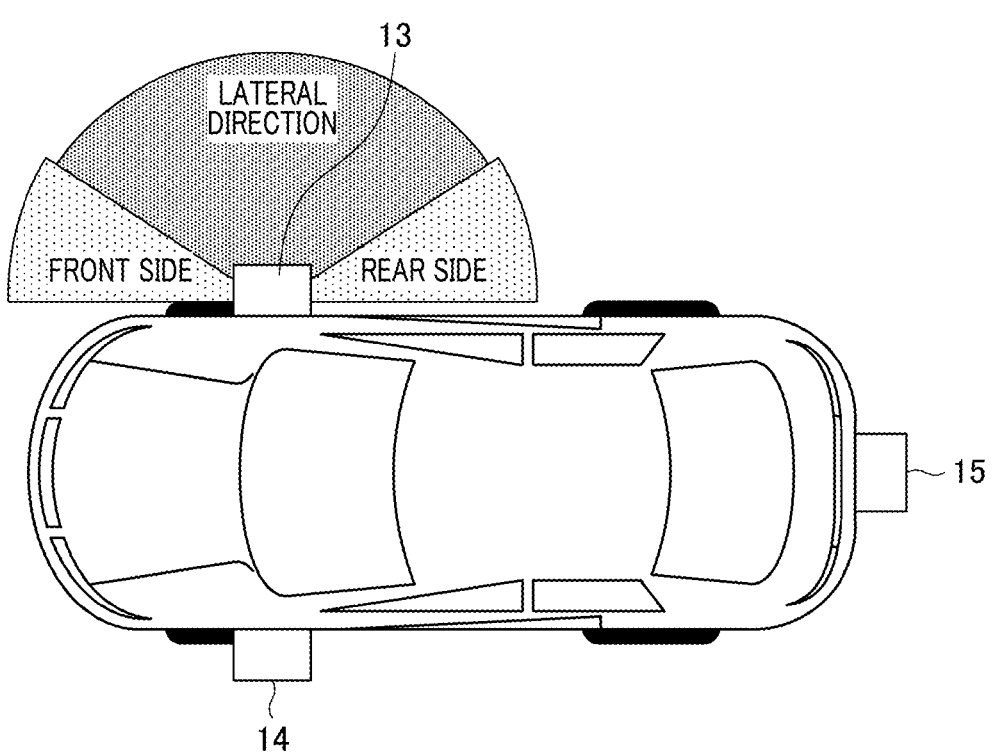
FIG. 2 is a diagram illustrating an example in which a right side camera 13, a left side camera 14, and a rear camera 15 mounted in a vehicle are disposed according to an embodiment of the present invention.

The image sensor is a CCD image sensor, a CMOS image sensor, or the like. As specific disposition of the camera, the camera is disposed as illustrated in FIG. 2. FIG. 2 is a diagram illustrating an example in which the right side camera 13, the left side camera 14, and the rear camera 15 mounted in the vehicle are disposed according to an embodiment of the present invention.

As illustrated in FIG. 2, the right side camera 13 is disposed on a lateral surface of the right front side of an automobile (vehicle) that is a movable apparatus, the left side camera 14 is disposed on a lateral surface on the left front side of the automobile, and the rear camera 15 is disposed on the rear side of the automobile.

Optical axes of the right side camera 13, the left side camera 14, and the rear camera 15 are oriented in a right lateral side of the vehicle substantially in a horizontal direction in a substantially horizontal state of the vehicle. Angle of fields of the right side camera 13, the left side camera 14, and the rear camera 15 are about one hundred eighty degrees.

The right side camera 13 and the left side camera 14 have optical properties in which resolutions of peripheral portions of angles of fields corresponding to the front and rear sides of the vehicle are higher than resolutions of central portions (vicinities of the optical axes) of the angles of fields. On the other hand, the optical system of the rear camera 15 has an optical property in which the resolution in the vicinity of the center of the optical axis is higher than the resolution of the peripheral portion of the angle of field.

4

Figures 3A, 3B:
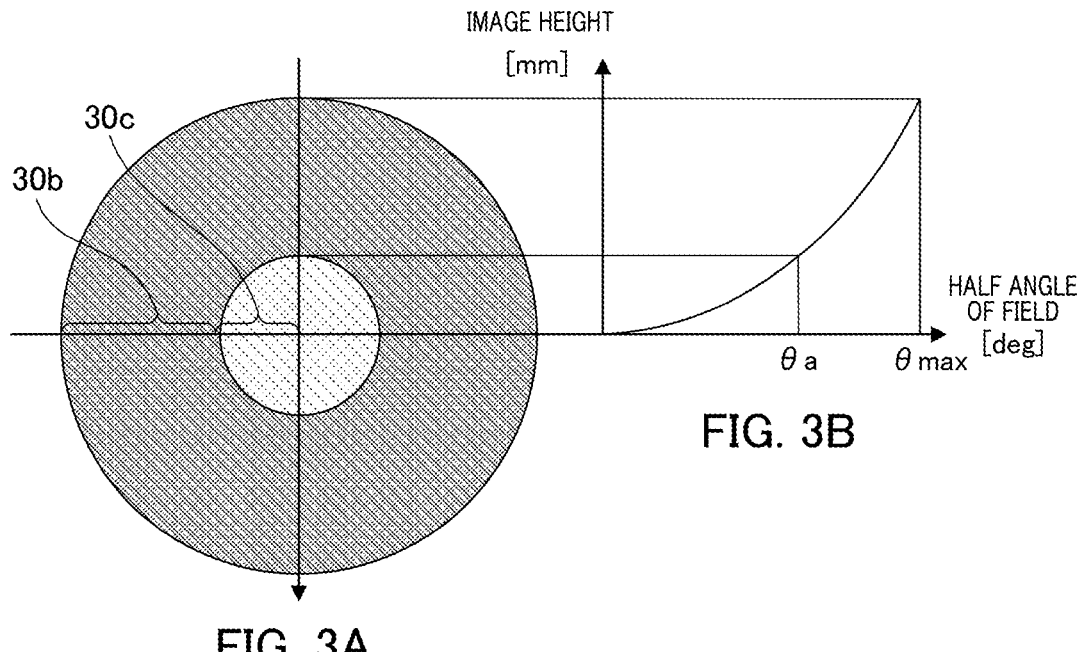
FIGS. 3A and 3B are diagrams illustrating a property example of an optical system of the right side camera according to the present embodiment.

FIGS. 3A and 3B are diagrams illustrating a property example of an optical system of the right side camera according to the present embodiment. Since a property of the optical system of the left side camera is the same as a property of the optical system of the right side camera, a description thereof will be omitted. FIG. 3A is a diagram illustrating a contour line shape of an image height y at each half angle of field on a light reception surface of an image sensor of the optical system of the right side camera according to the present embodiment.

FIG. 3B is a diagram illustrating a projection property indicating a relation between the image height y and a half angle of field θ of the optical system of the right side camera according to the present embodiment. In FIG. 3B, the horizontal axis represents the half angle of field (an angle formed between an optical axis and an incident ray) θ, and the vertical axis represents a height of a formed image (image height) y on the light reception surface (image surface) of the image sensor of the right side camera.

The optical system of the right side camera according to the present embodiment is configured such that the projection property y(θ) is different in a region where a half angle of field is less than a predetermined half angle of field θa and a region where a half angle of field is equal to or greater than a predetermined half angle of field θa, as illustrated in FIG. 3B. Accordingly, when an increase amount of the image height y with respect to the half angle of field θ per unit is a resolution, the resolution differs depending on the region.

It can be said that a local resolution can also be indicated by a derivative dy(θ)/dθ at the half angle of field θ of the projection property y(θ). That is, as an inclination of the projection property y(θ) in FIG. 3B is greater, the resolution is higher. It can be said that as an interval of the image height y at each half angle of field of the contour line shape in FIG. 3A is greater, the resolution is higher.

In the present embodiment, a region in the vicinity of the center formed on the light reception surface of the image sensor when the half angle of field θ is less than the predetermined half angle of field θa is referred to as a low-resolution region 30c, and another region where the half angle of field θ is equal to or greater than the predetermined half angle of field θa is referred to as a low-resolution region 30b.

The optical system of the right side camera according to an embodiment has the projection property y(θ) satisfying conditions of the following Formula 1. That is, when f is a focal distance of the optical system, θ is a half angle of field, y is an image height on an image surface, y(θ) is a projection property indicating a relation between the image height y and the half angle of field θ, and θ max is a maximum half angle of field of the optical system, the following Formula 1 is satisfied.

$$0.1 < 2 \times f \times \tan(\theta\max/2)/y(\theta\max) < 1.2 \quad \text{(Formula 1)}$$

More preferably, the following Formula 2 is satisfied.

$$0.2 < 2 \times f \times \tan(\theta\max/2)/y(\theta\max) < 0.92 \quad \text{(Formula 2)}$$

A position at which the light reception surface of the image sensor intersects an optical axis of the optical system may substantially match the center of the light reception surface. The position at which the light reception surface of the image sensor intersects the optical axis of the optical system may deviate from the center of the reception surface. In this case, when Ls1 is a width of the light reception surface and Lshift is an amount of deviation, 0<Lshift/Ls1<0.5 is preferably satisfied.

By displaying an image from the right side camera that has the optical property as in FIGS. 3A and 3B, it is possible to obtain the rear image indicated in FIG. 2 as a high-resolution image at an angle of field similar to the right side mirror. A high-resolution image with an angle of field of the right front of the vehicle illustrated in FIG. 2 is obtained. Accordingly, visibility of the front side or the rear side can be increased. When a subject on the front side or the rear side is recognized as an image, image recognition accuracy can be raised.

As illustrated in FIG. 2, an image at an angle of field right beside the vehicle is an image that has a relatively low resolution. However, by performing a distortion correction process, it is possible to display the image as a side-view image which is wide in the horizontal direction of the vehicle.

The optical system of the left side camera 14 has a similar optical property to the optical system of the right side camera 13. That is, the optical system of the left side camera has an optical property in which a resolution in the periph-eral portion of the angle of field is higher (low distortion) than in the vicinity of the center of the optical axis. The optical system of the rear camera 15 preferably has the optical property in which a resolution of the vicinity of the center of the optical axis is higher than a resolution of the peripheral portion of the angle of field.

In this way, according to the present embodiment, the rear image acquisition unit that acquires a rear image includes not only the rear camera 15, but also, the right side camera 13 and the left side camera 14 in which an optical system capable of performing imaging from a front side to a rear side of a lateral surface of the movable apparatus is able to capture a wide-angle video.

The positions of the right side camera 13, the left side camera 14, and the rear camera 15 are not limited to the positions illustrated in FIG. 2. Further, the optical properties of the optical systems of the right side camera 13, the left side camera 14, and the rear camera 15 are not limited to the above-described properties.

Referring back to FIG. 1, an obstacle avoidance path calculation unit 106 acquires information indicating whether a turn is a right turn or a left turn from the right or left turn detection unit 101 and information regarding a traveling path of the vehicle from the traveling path calculation unit 102. The obstacle avoidance path calculation unit 106 acquires information regarding whether there are obstacles on the right side, the left side, and the rear side of the vehicle and information regarding distances from the vehicles from the right obstacle detection unit 103, the left obstacle detec-tion unit 104, and the rear obstacle detection unit 105, and calculates a path in which the obstacles can be avoided.

Here, the obstacle avoidance path calculation unit 106 calculates an avoidance path for avoiding an obstacle in front.

Information that is calculated by the obstacle avoidance path calculation unit 106 and is information regarding a path on which an obstacle can be avoided, warning information in a case in which there is no avoidable path, and the like, are supplied to a sound warning control unit 108 and a monitor control unit 109. The warning information in the case in which there is no avoidable path is supplied to a rear image processing unit 107.

When the warning information in the case in which there is no avoidable path is received, the rear image processing unit 107 outputs an image obtained by cutting a rear image from the rear camera 15 at an angle of field of a wide angle to the monitor control unit 109.

The sound warning control unit 108 controls a sound that is output by the sound output unit 16 based on the informa-tion regarding the path in which the obstacle can be avoided from the obstacle avoidance path calculation unit 106 or the warning information in the case in which there is no avoid-able path. The monitor control unit 109 generates an image or a text that is output to the monitor 17 based on the information regarding the path in which the obstacle can be avoided from the obstacle avoidance path calculation unit 106 or the warning information in the case in which there is no avoidable path.

Here, the monitor 17 is, for example, a monitor for car navigation, or the like, that is provided inside the vehicle and is capable of displaying map information. The monitor 17 may be a display device such as a head-up display that displays an image or an icon as a virtual image to superim-pose the image on the front glass of the vehicle. Here, the monitor 17 functions as a display unit that displays a rear image from at least the rear camera 15 (a rear image acquisition unit).

Figure 4:
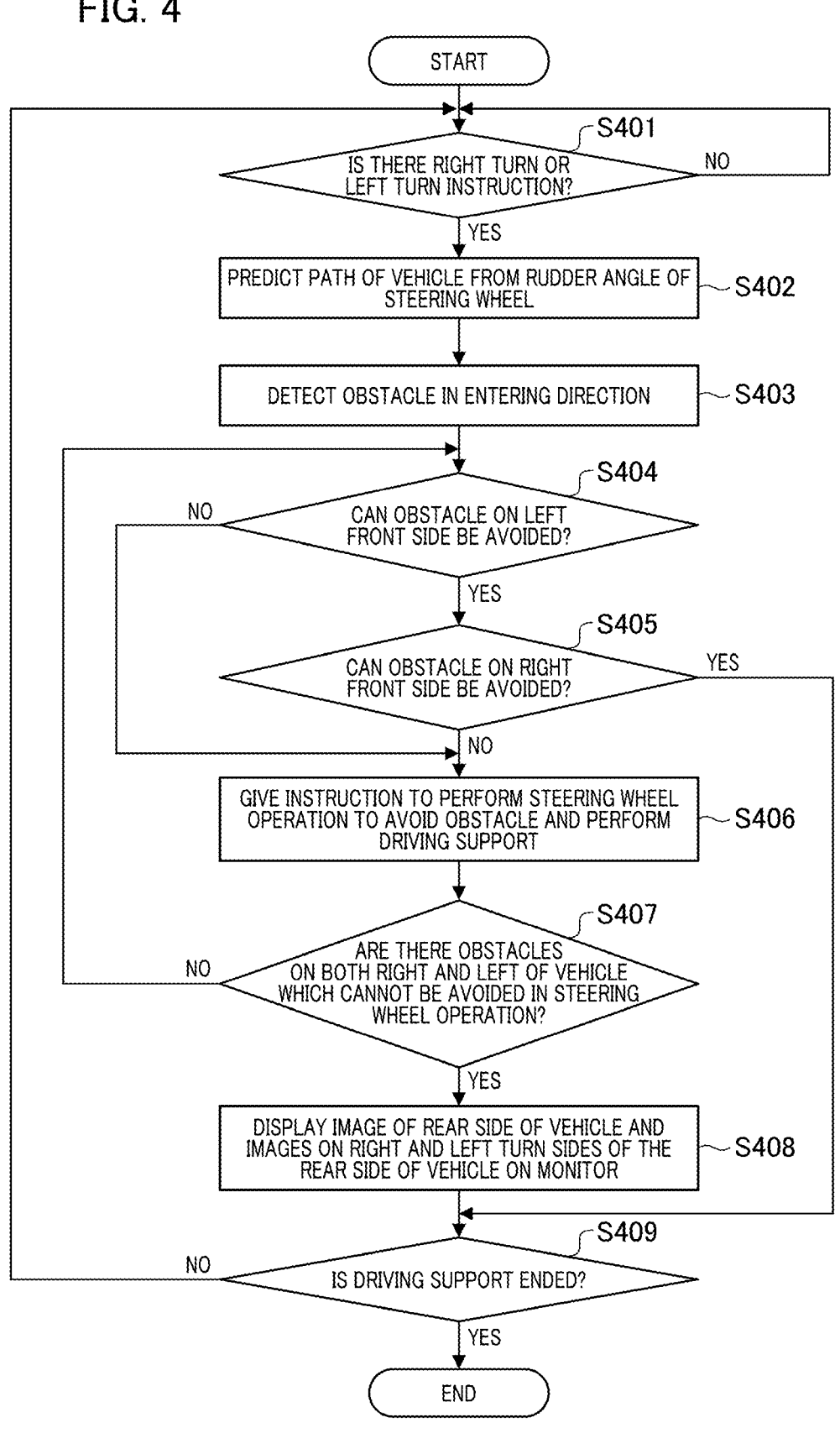
FIG. 4 is a flowchart illustrating an example of an image display method during a left turn performed in an image processing system 100 according to an embodiment of the present invention.

Next, an example during a left turn of the image process-ing system 100 according to the present embodiment will be described with reference to FIG. 4. FIG. 4 is a flowchart illustrating an example of an image display method during or a left turn performed in the image processing system 100 according to an embodiment of the present invention.

The CPU (not illustrated) serving as a computer in the image processing system 100 performs an operation each step of the flowchart of FIG. 4 by executing a computer program stored in a memory (not illustrated). The flow of FIG. 4 is started by turning on a driving support switch (not illustrated).

In step S401, the CPU of the image processing system 100 determines whether the indicator operation unit 11 gives an instruction during a right or left turn when a driver of the vehicle operates an indicator. For example, a case in which the driver pulls the indicator to the left and the right or left turn detection unit 101 detects there is a left turn instruction will be assumed.

When the right or left turn detection unit 101 does not detect the right or left turn instruction, the process returns to step S401 to perform the process of step S401. When the right or left turn detection unit 101 detects the left turn instruction, the CPU of the image processing system 100 causes the traveling path calculation unit 102 to predict a path of the vehicle (left turn path) based on information of a rudder angle of the steering wheel from the steering wheel operation unit 12 in step S402.

Then, in step S403, the CPU of the image processing system 100 causes the obstacle avoidance path calculation unit 106 to detect an obstacle in an entering direction based on detection results of the right obstacle detection unit 103 and the left obstacle detection unit 104 and a path of the vehicle obtained by the traveling path calculation unit 102.

Figure 5:
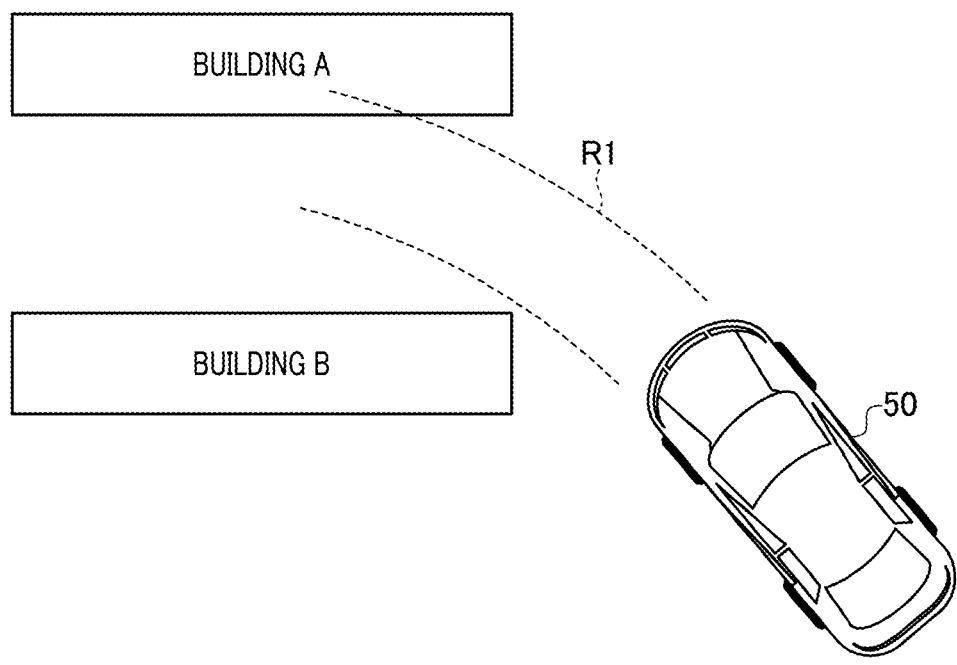
FIG. 5 is a diagram illustrating an example in which there is an obstacle such as a building on a traveling path of a vehicle according to an embodiment of the present invention.

Specific control by the obstacle avoidance path calcula-tion unit 106 will be described with reference to FIG. 5. FIG. 5 is a diagram illustrating an example in which there is an obstacle such as a building on a traveling path of the vehicle according to an embodiment of the present invention. FIG. 5 illustrates an example in which there is Building A on a path on the right side of a vehicle 50 in a traveling path R1.

In the example of FIG. 5, a contact with an obstacle (Building B) on the left front side can be avoided in this state.

In step S404, the CPU of the image processing system 100 causes the obstacle avoidance path calculation unit 106 to determine whether driving is performed without change and the obstacle on the left front side can be avoided. When No is determined, the process proceeds to step S406 to perform step S406. When Yes is determined in step S404, the process proceeds to step S405 to perform step S405.

In step S405, the CPU of the image processing system 100 causes the obstacle avoidance path calculation unit 106 to determine whether an obstacle on the right front side can be avoided in step S405. When Yes is determined in step S405, the process proceeds to step S409 to perform step S409. Here, steps S404 and S405 function as a path calculation step of calculating an avoidance path for avoiding an obstacle in front.

Conversely, when No is determined in step S405 and driving is performed without change, a collision with Building B occurs as the path of FIG. 5. Accordingly, in step S406, the CPU of the image processing system 100 outputs an instruction to operate the steering wheel in a direction in which the obstacle in the right front side is avoided through a steering wheel operation, that is, to the left.

Accordingly, driving support is performed to avoid Building A. When No is determined in step S404, the CPU of the image processing system 100 outputs a direction in which the obstacle in the left front side is avoided through a steering wheel operation, that is, an instruction to operate the steering wheel to the right in step S406. Accordingly, driving support is performed to avoid a contact with Building A.

In this way, according to the present embodiment, when there is the path for avoiding an obstacle, an instruction to change the traveling direction of the movable apparatus to an avoidance path direction is output. In step S406, such an instruction is given to perform driving support when the driver performs a steering wheel operation.

That is, the driving support is performed by issuing a warning such as "Please turn steering wheel more to the left (or to the right)" on a display screen of the display device. In step S406, a driving control unit that controls a traveling direction of the movable apparatus based on an output of the path calculation unit may be further provided to give an instruction to change the traveling direction to the driving control unit.

Subsequently, in step S407, the CPU of the image processing system 100 determines whether there are obstacles on both the right and left of the vehicle that cannot be avoided by the steering wheel operation. For example, in the example illustrated in FIG. 5, since the steering wheel operation to the left cannot be further performed, it is determined that an obstacle in the right front cannot be avoided.

When Yes is determined in step S407, the process proceeds to step S408 to perform step S408. When No is determined in step S407, the process returns to step S404 and perform step S404 again.

In step S408, the obstacle avoidance path calculation unit 106 instruct the rear image processing unit 107 and the monitor control unit 109 to acquire a rear image of the vehicle by the rear camera 15 and images on right or left turn sides of the rear side of the vehicle and display the images on the monitor 17.

That is, according to the present embodiment, an image at a wide predetermined angle of field in the rear images of the vehicle acquired from the rear camera 15 is displayed on the monitor in step S408. The images on the right or left turn sides among the rear images obtained by the right side camera 13 and the left side camera 14 are displayed on the monitor 17 as in FIG. 6. The details will be described below. Then, the process proceeds to step S409 to perform step S409.

Here, step S408 functions as a display step of displaying a rear image. Steps S407 and S408 function as a display control step (display control unit) to display a rear image at a predetermined angle of field acquired by the rear image acquisition unit when it is determined in the path calculation step that there is no path in which an obstacle in front can be avoided.

According to the present embodiment, before the movable apparatus is backed up or is moved backward, the rear image at the predetermined angle of field that is wide right and left as described above is displayed.

In step S409, the CPU of the image processing system 100 determines whether the driving support ends by turning the driving support switch off. When No is determined, the process returns to step S401 to repeat the above-described series of operations. When Yes is determined in step S409, the flow of FIG. 4 ends.

Figure 6:
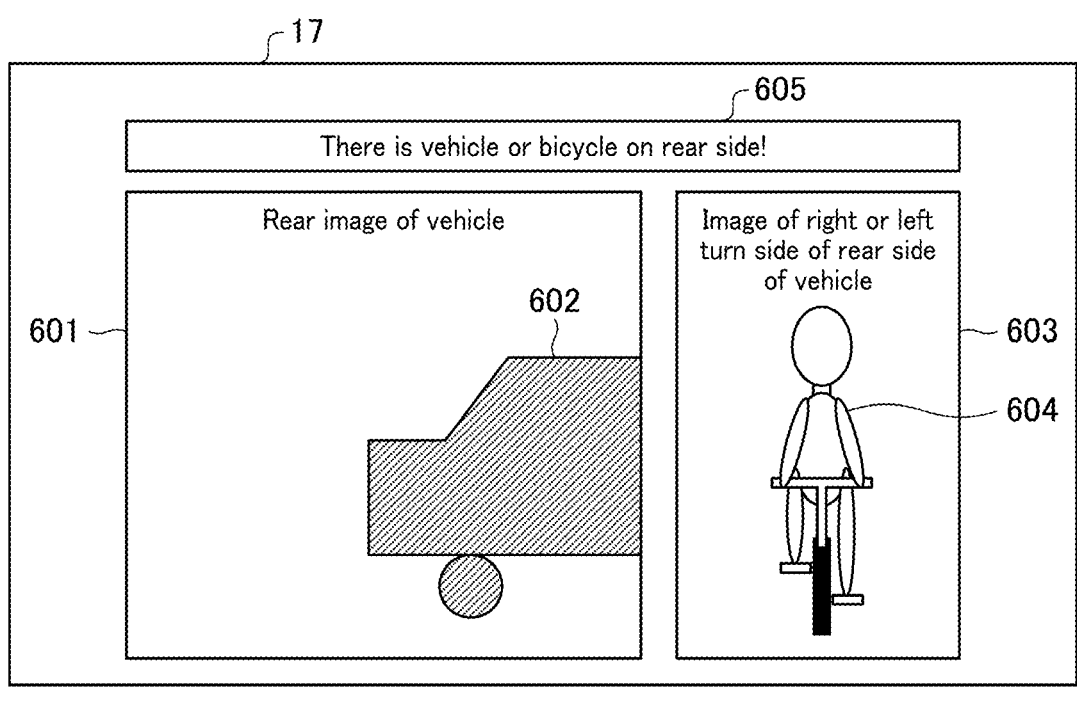
FIG. 6 is a diagram illustrating a display example of a monitor 17 when it is determined that there is an obstacle that cannot be avoided in a steering wheel operation.

Here, the image displayed on the monitor 17 is, for example, an image illustrated in FIG. 6. FIG. 6 is a diagram illustrating a display example of the monitor 17 when it is determined in step S407 that there is an obstacle that cannot be avoided in a steering wheel operation.

As illustrated in FIG. 6, a rear image at a predetermined angle of field that is wide to the right and the left of the rear side of the vehicle is displayed in a left display region 601 of the monitor 17. The predetermined angle of field at this time is set to an angle of field that is wider to the right and the left than an angle of field of a rear image displayed on an electronic rear-view mirror (not illustrated) when normal traveling is performed at a predetermined speed or more.

In the display region 601 of FIG. 6, for example, a following vehicle 602 is displayed as a rear image when the own vehicle turns left. In a right display region 603 of the monitor 17, an image of the rear side of the left side of the vehicle is displayed.

In the example illustrated in FIG. 6, in the display region 603, for example, a rear image of the left side obtained from the left side camera 14 of the vehicle 50 is displayed since the own vehicle is turning left. In this example, a person riding bicycle 604 on the rear side of the left side is displayed.

In this way, according to the present embodiment, a rear image at a predetermined angle of field that is wide to the right and left from the rear camera 15 and an image of a left rear side (slant left rear side) of the movable apparatus from the left side camera 14 are displayed on the monitor 17. In the case of a right turn, an image of the right rear side (slant right rear) of the movable apparatus from the right side camera 13 is displayed on the monitor 17.

In this way, according to the present embodiment, when it is determined in step S407 that there is an obstacle that the vehicle that cannot be avoided in the steering wheel operation, the image illustrated in FIG. 6 is displayed on the monitor 17. Therefore, before the driver backs the vehicle up, the driver can recognize the obstacle on the rear side.

Further, not only is the rear image displayed, but text such as "THERE IS VEHICLE OR BICYCLE ON REAR SIDE!" may be displayed or a warning mark may blink for a warning in a display region 605 in the upper portion of the monitor 17 in FIG. 6.

As described above, while the movable apparatus is traveling at a predetermined speed or more, an image in a narrow range (an angle of field narrower than the predetermined angle of field display in the step S408) near the center of the angle of field in a rear image captured by the rear camera 15 may be displayed on the electronic rear-view mirror.

In this case, in the optical system of the rear camera, a resolution of the peripheral portion of the angle of field is lower than a resolution of a central portion of the angle of field. Therefore, a vehicle, or the like, on the rear side can be displayed with a high resolution on the electronic rear-view mirror.

In step S408, a rear image at the predetermined angle of field that is broader to the right and left than the rear image at a narrow angle of field displayed on the electronic rear-view mirror during the normal traveling is displayed. That is, the rear image processing unit 107 displays an image from the rear camera 15 by cutting a region at a right and left wide angle. At this time, an image on the same side as the right or left turn may be cut more broadly than an opposite image and displayed.

In step S408, as described above, a slant rear image is displayed in the display region 603, or the like, of FIG. 6 using video data from, for example, the left side camera 14 or the right side camera 13 to acquire a side or rear image of the vehicle.

However, a function of a distance sensor, or the like, such as a LiDAR (not illustrated) mounted on the side of the vehicle may be used to detect there is an obstacle and display an icon or display a position, a shape, or the like, of the obstacle on the monitor 17. The rear image acquisition unit according to the present embodiment includes such a LiDAR.

In step S407, the obstacle avoidance path calculation unit 106 determines that the vehicle cannot avoid an obstacle by the steering wheel operation. In step S407, however, for example, when a road width in a traveling direction is narrower than a predetermined width, the vehicle enters a path (road) for one-way passage, or when the vehicle enters a private land, it can be determined that the vehicle cannot avoid an obstacle based on map information or GPS included in the movable apparatus.

That is, when the movable apparatus erroneously enters a path into which the movable apparatus is not allowed to intrude, a rear image at the predetermined angle of field acquired by the rear camera 15 may be displayed on a display unit. The path into which the movable apparatus is not allowed to intrude includes one of a path in which a width of a predetermined value or less, a one-way path, and a private land, as described above.

Even in this case, it is necessary to back the vehicle up, it is possible to inhibit an accident from occurring by automatically display the rear side as in step S408 during the back-up.

In FIG. 6, the example during the left turn has been described. During a right turn, the right and left may be reversed to perform the same control, and thus it is possible to inhibit collision with an obstacle during the back-up. According to the present embodiment, the control in which a rear image is automatically displayed when the vehicle is not allowed to move forward has been described. However, for example, when the vehicle is parking while backing the vehicle up in a parking lot or the like and the vehicle cannot step back, a front image, in particular, a wide-angle front image, may be displayed.

As described above, when it is detected that the vehicle cannot avoid an obstacle in front in a steering wheel operation during a right or left turn and the vehicle does not move forward, the driver can be notified quickly of a danger on the rear side of the own vehicle by automatically displaying information regarding the rear side on the monitor 17. Accordingly, it is possible to inhibit an accident occurring since a driver's attention is diverted to a contact with an obstacle in front and the driver backs the vehicle up without checking the rear side.

The movable apparatus according to the above-described embodiment is not limited to a vehicle such as an automobile, and anything such as a ship, an airplane, a robot, and a drone can be used as long as it can move.

In the embodiment, the image processing system is mounted in a vehicle that is the movable apparatus and includes an imaging unit that generates video data. However, an image processing system, a monitor, a sound output unit, or the like, may be provided in an external terminal located at a location away from the movable apparatus, and the movable apparatus may be remotely controlled at the remote location using the external terminal. The image processing system according to the present invention includes such a thing.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing systems through a network or various storage media. Then, a computer (or a CPU, an MPU, or the like) of the image processing system may be configured to read and to execute the program. In such a case, the program and the storage medium storing the program configure the present invention.

The present invention includes inventions implemented using at least one processor or circuit configured to function as the embodiments explained above. A plurality of processors may be used for a distribution process.

What is claimed is:

1. A movable apparatus comprising:
a rear image acquisition unit configured to acquire a rear image of the movable apparatus;
a display unit configured to display the rear image from the rear image acquisition unit; and
at least one processor operatively coupled to a memory, serving as:
a path calculation unit configured to calculate an avoidance path for avoiding an obstacle in front;
a display control unit configured to cause the display unit to display a rear image of a predetermined angle of field acquired by the rear image acquisition unit when the path calculation unit determines that there is no path in which the obstacle in front is able to be avoided or the movable apparatus enters a path into which the movable apparatus is not allowed to intrude; and
a driving control unit configured to control a traveling direction of the movable apparatus based on an output of the path calculation unit.

2. The movable apparatus according to claim 1, wherein, when the path calculation unit determines that there is no path in which the obstacle is able to be avoided, the display control unit causes the display unit to display the rear image of the predetermined angle of field acquired by the rear image acquisition unit before the movable apparatus is moved backward.

3. The movable apparatus according to claim 1, wherein the display control unit displays a rear image of an angle of field narrower than the predetermined angle of field and from the rear image acquisition unit on an electronic rear-view mirror while the movable apparatus is traveling at a predetermined speed or more.

4. The movable apparatus according to claim 1, wherein, when the path calculation unit determines that there is no path in which the obstacle is able to be avoided, the display control unit causes the display unit to display a rear lateral image of the movable apparatus and the rear image of the predetermined angle of field from the rear image acquisition unit.

5. The movable apparatus according to claim 1, wherein the path into which the movable apparatus is not allowed to intrude includes one of a path with a width of a predetermined value or less, a one-way path, and private land.

6. The movable apparatus according to claim 1, wherein, when there is a path in which the obstacle in front is able to be avoided, the path calculation unit outputs an instruction to change a traveling direction of the movable apparatus to an avoidance path direction.

7. The movable apparatus according to claim 1, wherein the rear image acquisition unit includes an imaging unit configured capture a wide-angle video through an optical system capable of imaging a front side to a rear side of a lateral side of the movable apparatus.

8. The movable apparatus according to claim 7, wherein the optical system has an optical property in which a resolution of a peripheral portion of an angle of field is higher than a resolution of a central portion of the angle of field.

9. The movable apparatus according to claim 8, wherein, when f is a focal distance of the optical system, $\theta$ is a half angle of field, y is an image height on an image surface, $y(\theta)$ is a projection property indicating a relation between the image height y and the half angle of field $\theta$, and $\theta$ max is a maximum half angle of field of the optical system, $0.1 < 2 \times f \times \tan(\theta \max/2)/y(\theta \max) < 1.2$ is satisfied.

\* \* \* \* \*